No. 638,814.

A. J. SAWIN.
PIPE TONGS.
(Application filed June 21, 1899.)

(No Model.)

Patented Dec. 12, 1899.

WITNESSES
Franklin T. B. Vale
Frank Meredith Vale

Abraham J. Sawin
INVENTOR.

UNITED STATES PATENT OFFICE.

ABRAHAM J. SAWIN, OF VENTURA COUNTY, CALIFORNIA.

PIPE-TONGS.

SPECIFICATION forming part of Letters Patent No. 638,814, dated December 12, 1899.

Application filed June 21, 1899. Serial No. 721,397. (No model.)

*To all whom it may concern:*

Be it known that I, ABRAHAM J. SAWIN, a citizen of the United States, residing near Springville, in the county of Ventura and State of California, have invented certain new and useful Improvements in Pipe-Tongs; and I do hereby declare that the following is a full, clear, and exact description of the invention, which will enable others skilled in the art to which it appertains to make and use the same, reference being had to the accompanying drawings, which form a part of this specification, and in which—

Figure 1:
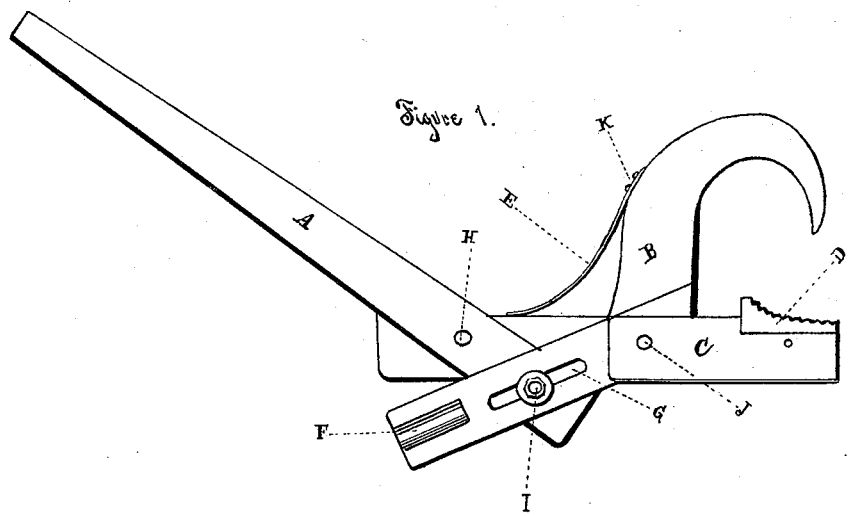
Figure 2:
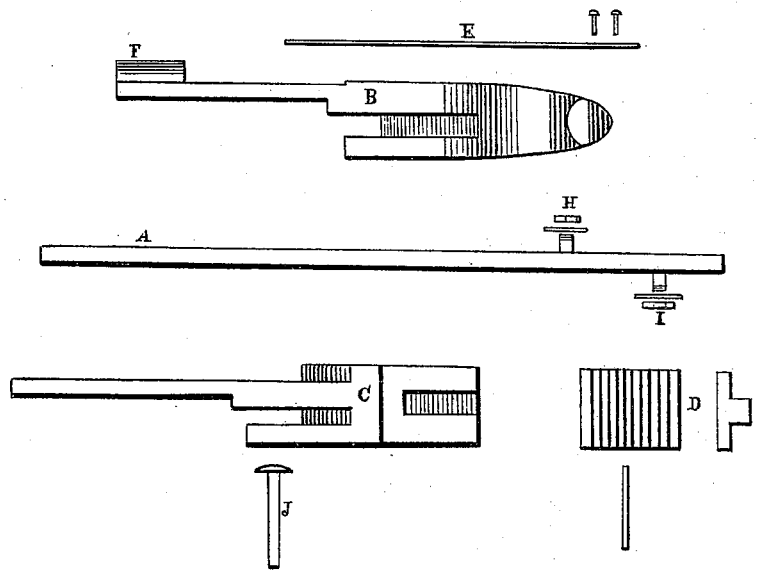

Figure 1 is a side view of my improved pipe-tongs. Fig. 2 is an edge view of the several unassembled parts.

Like letters of reference indicate like parts throughout both figures.

My invention has relation to pipe-tongs; and it consists in the improved construction and combination of parts, as will be hereinafter fully described, and pointed out in the claim.

Referring to the accompanying drawings, A represents the handle; B, the hooked upper jaw; C, the lower jaw; D, the removable die attached to the lower jaw; E, the spring attached to the upper jaw; F, the knob attached to the upper jaw; G, the slot in the shank of the upper jaw; H, the point of the pivoted attachment of the handle to the lower jaw; I, the point of pivoted attachment of the handle to the upper jaw; J, the point of pivoted attachment of the upper to the lower jaw, and K the point of attachment of the spring to the upper jaw.

The hooked upper jaw B is pivoted to the lower jaw C at the point J and is also pivoted to the handle at the point I. The lower jaw C is pivoted to the handle at the point H. Attached to the upper jaw at the point K is a straight spring E, whose outer end slides along the upper edge of the lower jaw C. The lower jaw C has also a mortise-slot in its outer end, in which is pinned the removable die D. Attached to the side of the shank at the inner end of the upper jaw B is a knob F. The handle is pivoted to the upper jaw at the point I and to the lower jaw at the point H by means of pins firmly affixed to the handle and threaded at their outer ends and secured by washer and nut, the washer serving to prevent the nut from unscrewing.

An advantage of my pipe-tongs rests in the fact of there being but a single handle to grasp in operating the same, and another in the fact that the spring device attached to the upper jaw materially assists in operating the tongs by tending to hold the jaws of the tongs closed, thus automatically holding the jaws of the tongs close to the pipe or other object being operated upon. Another advantage rests in the fact of the knob attached to the end of the upper jaw being a convenient aid in operating the tongs. Another advantage rests in the fact of the removable die pinned in mortise-slot at outer end of lower jaw by its peculiar shape aiding to effect a hold upon different sizes of pipe. Another advantage of these tongs is that they require no adjustment in any particular whatever to enable their being operated upon different sizes of pipes.

Having thus fully described my invention, I claim and desire to secure by Letters Patent of the United States—

In a pair of pipe-tongs, the combination of a hooked upper jaw pivoted to a straight lower jaw and the extended shanks of each jaw pivoted at their inner ends to a single handle, said handle being allowed freedom of motion by means of sliding pivoted attachment through an elongated slot in the lower jaw; said pipe-tongs mechanism being automatically assisted in its operation by means of a strong straight spring attached to the back of the upper jaw and sliding upon the upper edge of the lower jaw, thus tending to hold the jaws of the tongs together; a knob attachment upon the side of upper jaw and near the inner end of same, useful and convenient in operating tongs; also a removable die attached at the outer end of the lower jaw aiding by its peculiar shape in taking firm hold upon different sizes of pipes and by its manner of attachment permitting of substitution of new parts.

In testimony that I claim the foregoing as my own I have hereunto affixed my signature in the presence of two witnesses.

ABRAHAM J. SAWIN.

Witnesses:
FRANK MEREDITH VALE,
FRANKLIN T. B. VALE.